United States Patent
Venkataraman

(10) Patent No.: US 9,077,529 B1
(45) Date of Patent: *Jul. 7, 2015

(54) METHOD AND APPARATUS FOR REDUCING NONLINEAR ECHO DISTORTION IN A COMMUNICATION DEVICE

(71) Applicant: MARVELL INTERNATIONAL LTD., Hamilton (BM)

(72) Inventor: Jagadish Venkataraman, Santa Clara, CA (US)

(73) Assignee: MARVELL INTERNATIONAL LTD. (BM)

( * ) Notice: Subject to any disclaimer, the term of this patent is extended or adjusted under 35 U.S.C. 154(b) by 24 days.

This patent is subject to a terminal disclaimer.

(21) Appl. No.: 13/961,130

(22) Filed: Aug. 7, 2013

Related U.S. Application Data

(63) Continuation of application No. 12/903,406, filed on Oct. 13, 2010, now Pat. No. 8,509,125.

(60) Provisional application No. 61/252,522, filed on Oct. 16, 2009.

(51) Int. Cl.
 *H04B 3/23* (2006.01)
 *H04B 3/20* (2006.01)
 *H04L 5/14* (2006.01)

(52) U.S. Cl.
 CPC .................................. *H04L 5/1461* (2013.01)

(58) Field of Classification Search
 CPC .................................. H04B 3/23; H04B 3/20
 USPC ........... 370/286; 455/67.11, 67.13, 67.14, 69; 379/390.01–390.02
 See application file for complete search history.

(56) References Cited

U.S. PATENT DOCUMENTS

| | | | | |
|---|---|---|---|---|
| 4,669,116 | A | * 5/1987 | Agazzi et al. | 379/406.08 |
| 4,999,830 | A | 3/1991 | Agazzi | |
| 5,148,427 | A | * 9/1992 | Buttle et al. | 370/291 |
| 6,240,144 | B1 | * 5/2001 | Ha | 375/297 |
| 6,317,419 | B1 | 11/2001 | Olafsson et al. | |
| 7,333,561 | B2 | 2/2008 | Pinckley et al. | |
| 7,471,670 | B1 | 12/2008 | Chen et al. | |
| 7,634,032 | B2 | 12/2009 | Chu et al. | |
| 8,077,642 | B2 | 12/2011 | Shoor | |
| 2004/0001559 | A1 | * 1/2004 | Pinckley et al. | 375/297 |
| 2004/0252652 | A1 | * 12/2004 | Berestesky et al. | 370/286 |
| 2005/0207346 | A1 | * 9/2005 | Chu et al. | 370/241 |
| 2009/0168672 | A1 | * 7/2009 | Shoor | 370/286 |

FOREIGN PATENT DOCUMENTS

GB  2 280 083 A  1/1995

* cited by examiner

*Primary Examiner* — Andrew Chriss
*Assistant Examiner* — Romani Ohri

(57) ABSTRACT

Systems, methods, and other embodiments associated with echo cancellation are described. According to one embodiment, a method includes generating, in a communication device, an address to a look-up table by using a first signal and a second signal. The look-up table is a two-dimensional look-up table configured to store a plurality of cancellation values arranged in a two-dimensional grid. The method also includes producing, in the communication device, a cancellation signal according to a cancellation value in the look-up table that corresponds to the address.

16 Claims, 5 Drawing Sheets

METHOD AND APPARATUS FOR REDUCING NONLINEAR ECHO DISTORTION IN A COMMUNICATION DEVICE

CROSS REFERENCE TO RELATED APPLICATIONS

This disclosure is a continuation of U.S. application Ser. No. 12/903,406 filed on Oct. 13, 2010, now U.S. Pat. No. 8,509,125 which claims benefit under 35 USC §119(e) to U.S. provisional application Ser. No. 61/252,522 filed on Oct. 16, 2009, which are both hereby wholly incorporated by reference.

BACKGROUND

A network switch is a device that communicatively connects two or more physical links in a network. A network switch can translate physical signals input on one type of link for output on another type of link. The network switch may also perform other functions such as determining the output link(s) to which a particular input should be translated. Example network switches include public switched telephone network (PSTN) switches, Ethernet switches, and asynchronous transfer mode (ATM) switches, among others.

In a network switch that translates between two or more different types of physical links, the physical translation of an input signal to an output link may give rise to a partial reflection of the input signal back toward the source of that signal, in addition to the intended transmission of the signal on the output link. For example, the circuitry that performs the translation may suffer an impedance mismatch between the different types of links. Such reflected or leaked signal is commonly referred to as "echo" because the source of the input signal receives a distorted version of the signal that is echoed back from the switch, the echoed signal being delayed by the round-trip transmission time between the source and the switch. This may also occur internally to the source where the signals being transmitted are echoed back to its own receiver. The echoed signal may then combine with any signal transmissions intend for the source, thereby distorting or polluting those transmissions. The portion of the translation path in the switch on which echo is generated is called the echo path. The echoed signal is one of the biggest sources of interference in 10GBASE-T, especially when the link-partner is located at distances comparable to 100 meters.

SUMMARY

In one embodiment, a communication device includes a communication path configured to receive and transmit signals. The communication device includes a look-up table configured to store a plurality of cancellation values arranged in a two-dimensional grid. The plurality of cancellation values are used to cancel non-linear distortion from the communication path. The communication device includes a cancelling circuit configured to use the look-up table to determine a cancellation value from the plurality of cancellation values to apply to the communication path to compensate for the nonlinear distortion on the communication path.

In another embodiment, a method includes generating, in a communication device, an address to a look-up table by using a first signal and a second signal. The look-up table is a two-dimensional look-up table configured to store a plurality of cancellation values arranged in a two-dimensional grid. The method also includes producing, in the communication device, a cancellation signal according to a cancellation value in the look-up table that corresponds to the address.

In another embodiment, a device includes a transmitter and a receiver. The device also includes an echo cancellation circuit configured to cancel non-linear echo signals by generating a cancellation signal according to a first signal and a second signal. The first signal and the second signal are transmitted by the transmitter. The first signal is a current signal and the second signal is a previous signal. The echo cancellation circuit is configured to apply the cancellation signal to a signal at the receiver. The device also includes a look-up table configured to store entries addressed by the first signal and the second signal.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with reducing or eliminating non-linear echo signals. Echo signals are a source of interference in communication devices like a 10G BASE-T device. In one embodiment, a cancellation circuit uses knowledge of echo data and compensates for arbitrary nonlinearities introduced by a transmitter's digital-to-analog converter (DAC).

Figure 1:
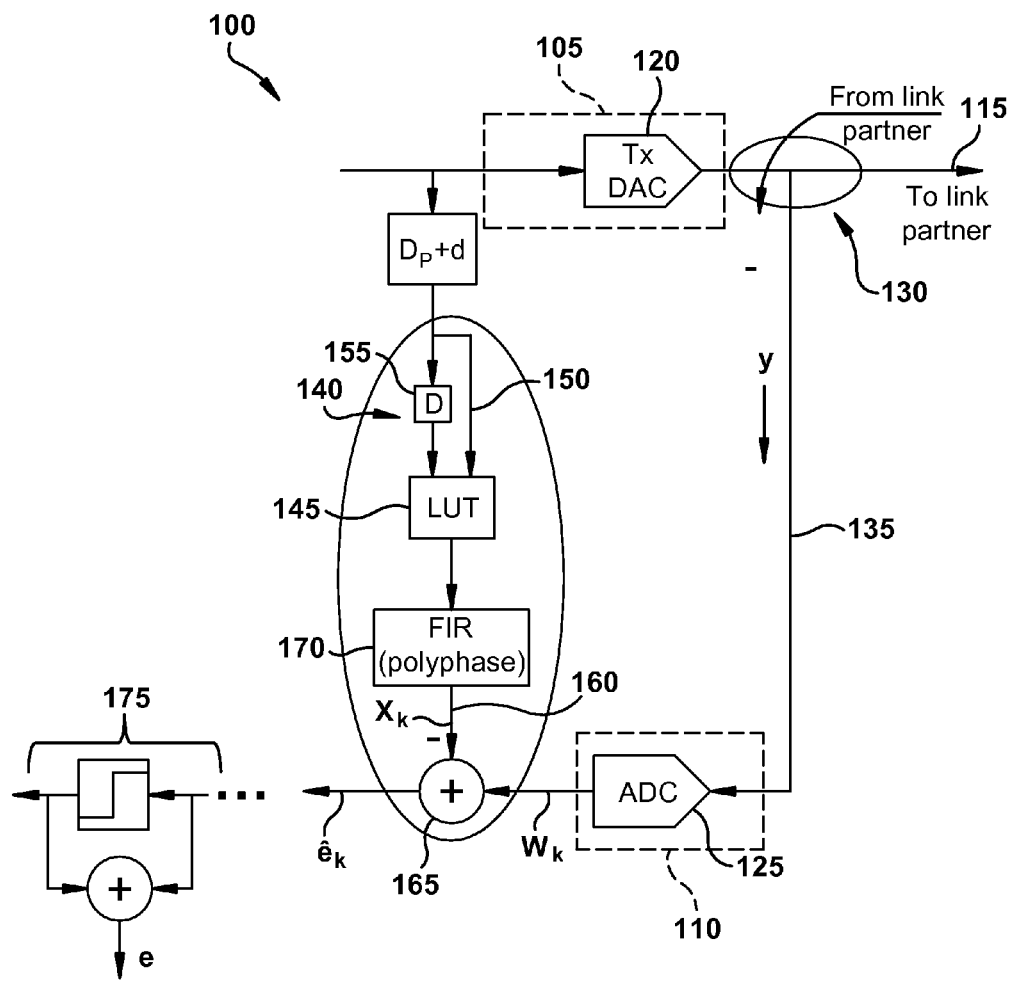
FIG. 1 illustrates one embodiment of an apparatus associated with nonlinear echo cancellation.

With reference to FIG. 1, one embodiment of an apparatus 100 is shown that is associated with cancellation of nonlinear echo distortion. The apparatus 100 is shown implemented in a network communication device that includes a transmitter 105 and a receiver 110 that are configured for connection to a communication interface (e.g. cable 115 via a port). Communication lines through the transmitter 105 and the receiver 110 define a transmission path and a receiving path, respectively. The cable 115 connects the apparatus 100 to a remote device (i.e., link partner). The transmitter 105 includes a digital-to-analog converter (DAC) 120 for converting outgoing transmission signals to analog form. The receiver 110 includes an analog-to-digital converter (ADC) 125 for converting incoming received signals to digital form. In one embodiment, the apparatus 100 is implemented on a chip including one or more integrated circuits configured to perform one or more of the functions described herein.

A hybrid circuit 130 is connected between the transmitter 105 and the receiver 110 for separating transmission signals and received signals to and from the cable 115. From the hybrid circuit 130, the transmission signals also feed back to the receiver 110 along a receive path 135, which creates an echo signal. This is also referred to as the echo channel h.

The linear portion of the echo signal is known at the receiver 110 and can be cancelled by analog means, digital means or both. However, the DAC 120 at the transmitter 105 introduces significant nonlinear distortion for high output voltage swings (e.g., 1 volt or more). Eliminating this distortion can, at times, provide up to 1 dB improvement in signal-to-noise ratio (SNR) margin at the receiver 110.

To cancel or at least reduce the nonlinear distortion, an echo canceller 140 is connected between the transmitter 105 and the receiver 110. The echo canceller 140 uses the knowledge of the echo signal and compensates for arbitrary nonlinearities introduced by the DAC 120. The echo canceller 140 includes a look-up table 145 that contains cancellation values. The cancellation values are associated with pairs of signals (e.g. two consecutive signals) to reduce (or substantially cancel) non-linear echo. How the cancellation values are determined are discussed below. In one embodiment, an analog propagation delay $D_p$ and a digital propagation delay d are applied to a currently transmitted signal to produce a delayed signal. The delayed signal becomes the preceding/previous signal to the next current signal on the transmission path. The look-up table 145 is addressed by a currently transmitted signal from the transmission path and a previously transmitted signal from the transmission path (e.g., two consecutive signals from the transmission path). The currently transmitted signal is carried on line 150 and the previously transmitted signal is carried on line 155, which includes a delay element (e.g. a flip-flop for storing the preceding previous value). The two signals are input to the look-up table 145. In another embodiment, the echo canceller 140 may be implemented to use three or more signals as input to the look-up table 145.

Using the two inputs as an address to a table entry, the look-up table 145 produces an output associated with the address. In one embodiment, a finite impulse response (FIR) filter 170 may be connected to the output of the look-up table 145 for additional adjustment of the signal. In one embodiment, the filter 170 may be a polyphase filter. The filter 170 is configured to emulate the echo channel from the DAC 120 to the analog-to-digital converter 125 while the look-up table 145 is configured to compensate for nonlinear echo distortion caused by the digital-to-analog converter 120. Output 160 (also represented as value $x_k$) is a cancellation signal applied to the receiving path at 165 to cancel nonlinear echo distortion in the signal that is fed back from the transmitter 120 to the receiver 110. Thus in one embodiment, one or more of the cancellation values in the look-up table 145 are applied to the receiving path to cancel non-linear echo distortion in a signal that is fed back from the transmitter 120 to the receiver 110.

After combining the signals at 165, a resulting error signal e is produced, which may include processing the signal through one or more blocks 175 as described below. If the cancellation signal 160 from the look-up table matches the echo signal on the receive path 135, the error signal will be zero. In one embodiment, the error signal may be fed back to adjust the cancellation value associated with the current signal and previous signal in the look-up table 145. The error signal may also be used to adjust coefficients in the filter 170. This will be described in more detail below.

Nonlinearity Model

Figure 2:
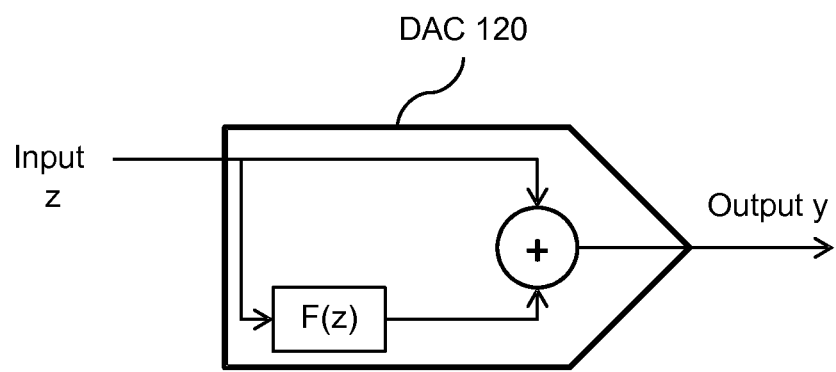
FIG. 2 illustrates one embodiment of non-linearity of a digital-to-analog converter.

In one embodiment, the DAC 120 nonlinearity is modeled as shown in FIG. 2. The DAC output consists of 2 components—a linear component and a nonlinear component (based on function F), which typically includes harmonics. Sometimes, the nonlinearity can also be dynamic, i.e., contain memory. The effect of memory is further compounded when the DAC output y propagates through the hybrid 130 to the ADC 125, which becomes part of the echo signal.

When the DAC 120 is perfectly linear, the output y at instant k is given by $$y_k = z_k$$

where the output signal y equals the input signal z. However, when the DAC 120 is nonlinear, the DAC output y contains harmonics in addition to the fundamental signal, thus resulting in outputs of the following form:

$$y_k = z_k + \alpha_0 z^3_k + \alpha_1 z^5_k + \ldots \text{ for static nonlinearity.}$$

$$y_k = z_k + \alpha_0 z^3_k + \alpha_1 z^2_k z_{k-1} + \alpha_2 z^3_{k-1} + \ldots \text{ for dynamic nonlinearity with 1-tap memory.}$$

or, in general, $y_k = z_k + F(z_k, z_{k-1}, z_{k-2}, \ldots)$, where F is any non-linear function of $z_k, z_{k-1}, z_{k-2} \ldots$.

With reference again to FIG. 1, the output y from the DAC 120, in addition to traveling through the cable 115 to an intended receiver (e.g. link partner), feeds back through the hybrid 130 via the echo channel h (along path 135) to the on-chip receiver 110. This feedback may cause significant echo distortion. The output from the ADC 125 is then given by:

$$w_k = r_k + (y * h)_k.$$

where $r_k$ is the actual received signal from the link partner, y is the output from the DAC 120. The memory in the echo channel h (along path 135) further compounds the memory in the nonlinearity and so, needs to be estimated to be able to eliminate the nonlinear distortion. In the following discussion, it is assumed that the linear distortion due to the echo signal is cancelled by other linear echo-cancellation circuits (not shown) and that the nonlinear distortion is estimated and removed by the echo canceller 140.

Figure 3:
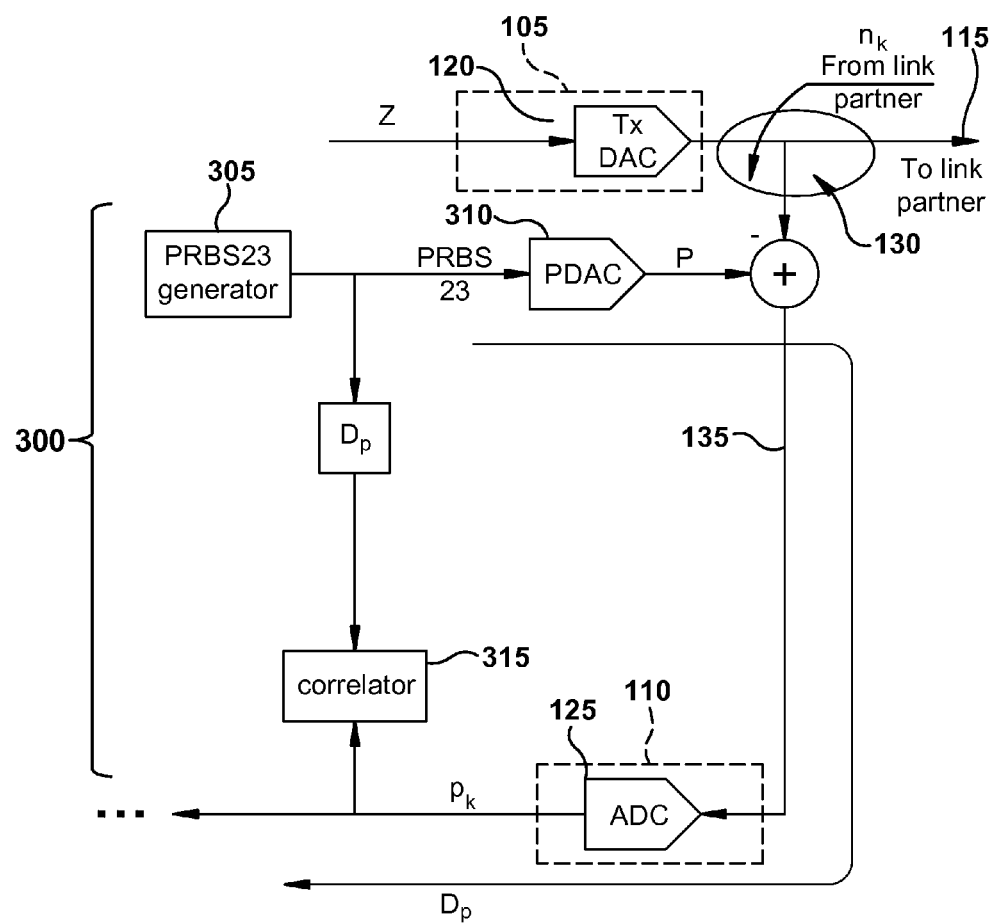
FIG. 3 illustrates one embodiment of an apparatus for determining echo cancellation values.

With reference to FIG. 3, the echo channel h is estimated by applying a known test sequence though a testing circuit 300 that is connected to the apparatus 100. In order to estimate the combined effect of the DAC 120 pulse response and the hybrid 130, a bit generator 305 generates a known 1-bit sequence. For example, the bit generator 305 may be a pseudo-random binary sequence (PRBS) generator that generates a PRBS 23 sequence, which is transmitted through a 1-bit DAC labeled PDAC 310. The ADC 125 output is then correlated (by a correlator 315) with a delayed version (to compensate for $D_p$, the propagation delay) of this PRBS sequence to estimate the echo channel. The delay compensation is then also used in the nonlinearity echo canceller 140 (FIG. 1, element $D_p$). For example, $$p_k = (h * P)_k + n_k = \sum_{i=0}^{L-1} h_i P_{k-i} + n_k$$

where $p_k$ represents the channel output consisting of the PRBS sequence P passed through the echo channel 'h' and $n_k$, which represents a combination of the echo data, the link partner data and noise. Upon correlating $p_k$ with a delayed version $D_p$ of PRBS 23, $$c_m = \sum_k p_k P_{k-m} = \sum_k \left(\sum_j h_j P_{k-j}\right) P_{k-m} = h_m \sum_k P_{k-m}^2$$

Thus, sweeping through the various values of in provides an estimate of h. The estimate value of h becomes the seed correction value for the filter 170. Additional correction values may then be found for other input values as well as dynamically adjusting the look-up table 145 during actual operation of the transmitter and feeding back error values.

Some schemes try to model DAC nonlinearities to be either of the Wiener or the Hammerstein type, i.e., a memoryless polynomial nonlinearity f followed by a filter, g. In these models, the DAC output is given by $y_k = z_k + (f(z)*g)_k$. Such models require an assumption about the degree of f, (e.g., the highest order harmonic produced by the DAC) as well as the form of "f" (e.g. polynomial, exponential, and so on). Both f and g can then be adapted according to minimum means square error (MMSE) constraints since $z_k$ is completely known at the receiver. These models can quickly grow out of control if the degree of f becomes high. To address this in one embodiment, the present scheme uses the arbitrary 2-D look-up table (LUT) 145 to model the combined effect off and g, which is assumed to contain 1-tap memory. Thus the model uses a combination of both a present signal and a previous signal to compensate for nonlinearities.

Non-Linear Cancellation (NLC) Scheme

With reference again to FIG. 1, in one embodiment, the address to the LUT 145 at instant k is given by $(z_k, z_{k-1})$, where $z_k$ is the current digital signal/symbol being transmitted and $z_{k-1}$ is the previous signal/symbol that was transmitted (e.g. the signal preceding the current signal). For example, the LUT 145 may be a 64×64 table and the current symbol is a 6 bit value used as the x address to the LUT 145 and the previous symbol is a 6 bit value used as the y address to the LUT 145. The output of the nonlinear echo canceller 140 is $x_k = (L(z_k, z_{k-1})*h)_k$ where L is the look-up table output for the given address. After combing the cancellation signal x with the output w from the ADC, an error signal is produced as error signal $\hat{e}_k = w_k - x_k$.

In some embodiments the echo canceller 140 may be followed by other functions/circuits 175 which may include a digital echo canceller, an FFE/DFE and/or other functions to produce a final error signal $e_k$. $e_k$ is approximated to be a delayed version of $\hat{e}_k$ plus some other terms that are independent of the LUT entries output by 145 as well as the FIR filter 170. In one embodiment, the circuit includes a function to minimize the power of the error signal $E[e^2]$.

Adapting the Non-Linear Echo Canceller

In one embodiment, the echo channel h estimate that is obtained using the PRBS sequence is used as the seed for the FIR filter 170 in the echo canceller 140. As stated previously, given the ADC output $w_k$, the error signal is given by, $$e_k = w_k - (L(z_k, z_{k-1})*h)_k.$$

Since the main tap of echo h is not fixed, error signal e is passed through a filter matched to h so that the error signal is available for update after a fixed delay. Defining $e'_k(e*h^-)_k$, the MMSE update equation for the LUT is given by, $$L^{k+1}(z_k, z_{k-1}) = L^k(z_k, z_{k-1}) + \mu \hat{e}_k \frac{\partial \hat{e}_k}{\partial L^n(z_k, z_{k-1})}$$

where $$\frac{\partial \hat{e}_k}{\partial L^n(z_k, z_{k-1})}$$

is approximated to be a constant under the assumption that $(h*h^-)_k = \delta_k$.

The LUT 145 can easily be overwhelmed with any linear or DC terms leaking into the table entries and accumulating over time. To avoid this, the update equation is modified to include a linear leakage and a DC leakage term.

If δ is the proposed increment in the LUT entry, the linear and DC leakage terms are computed as follows:

$$Kx = Kx + \delta z_k.$$

$$Ky = Ky + \delta z_{k-1}.$$

$$Ks = Ks + \delta.$$

In one embodiment, the LUT update equation is modified to include these terms as follows:

$$L^{k+1}(z_k, z_{k-1}) = L^k(z_k, z_{k-1}) + \mu \hat{e}_k - \mu_l \text{sign}(z_k)\text{sign}(Kx) - \mu_l \text{sign}(z_{k-1})\text{sign}(Ky) - \mu_d \text{sign}(Ks).$$

or in other words, the new value in the look-up table entry $L^{k+1}(z_k, z_{k-1})$ equals the old value in that LUT entry+the update without leakage−leakage for $z_k$−leakage for $z_{k-1}$−DC leakage.

In order to accommodate variations in the echo channel as well as in the ADC sampling phase, the FIR filter 170 may also be adapted according to the following MMSE update equation, $$h_j^{k+1} = h_j^k + \mu_h e_k v_{k-j} - \mu_n \text{sign}\left(h\frac{k}{j}\right)\text{sign}(\text{norm leakage}),$$

$$j = 0, 1, \ldots, L-1.$$

where, $v_{k-j} = L(z_{k-j}, z_{k-j-1})$.

The norm leakage term guarantees that the norm of the filter 170 is always close to 1 and may be computed as follows $$\text{norm leakage} = 1 - \Sigma_{j=0}^{L-1} h_j^2$$

This is used to ensure that the LUT entries and the filter coefficients do not interact to either saturate the fixed point dynamic range or go down to 0.

Figure 4:
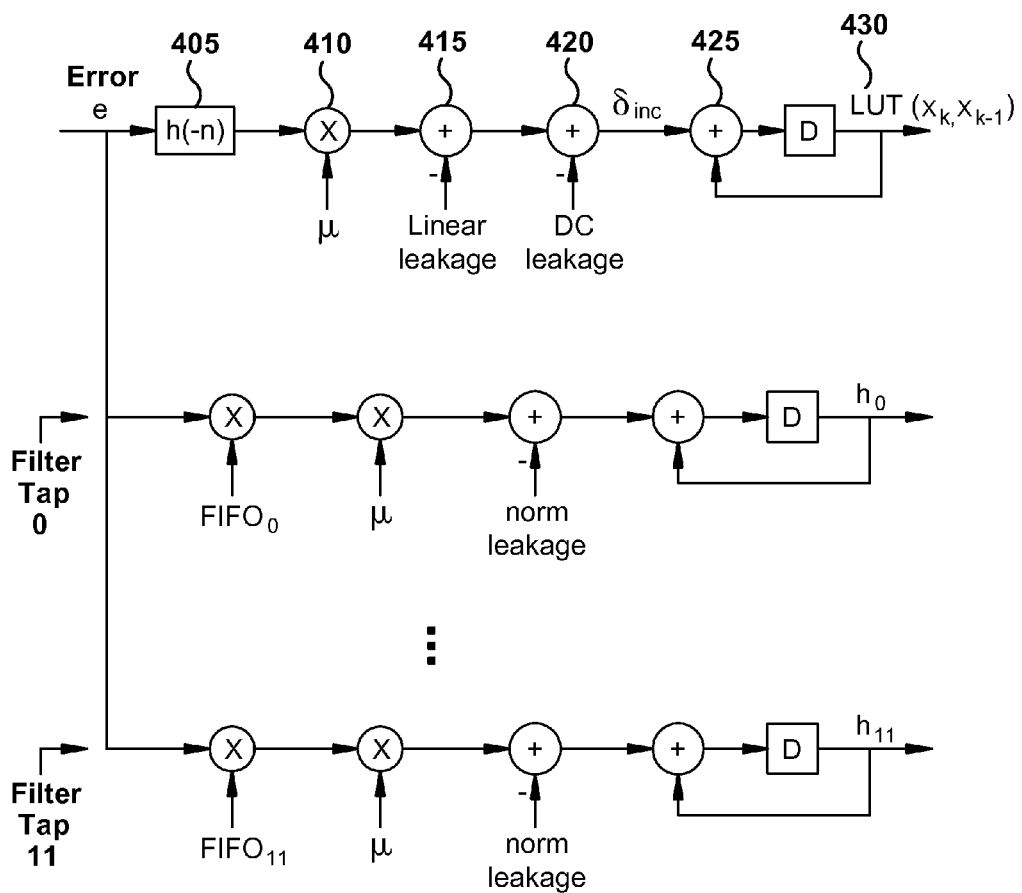
FIG. 4 illustrates one embodiment of a block diagram associated with adapting a look-up table and a filter with error signals.

With reference to FIG. 4, a block diagram of the adaptation process is shown, in one embodiment, in relation to the above equations. At 405, to adapt the look-up table 145, the error signal e is passed through a mirror image of the filter. At 410, the signal goes through μ where it is combined. At 415, the linear leakage is removed from the signal. At 420, the DC leakage is removed from the signal. At 425 and 430, the old value in the look-up table is incremented to produce a new value LUT $(x_k, x_{k-1})$.

To adapt the filter 170, assume the filter 170 includes twelve taps 0-11. Each tap has a separate engine to compute its associated echo, shown as $h_0$ to $h_{11}$. The error signal e is processed through a similar sequence except each tap uses the filter value (coefficient) in its corresponding position (e.g. $FIFO_0$ for tap 0, and so on). The norm leakage is removed as computed above. The adaptation process may be continuous in the apparatus 100 during its operation of transmitting and receiving data. In other embodiments, the adaptation may be performed periodically.

Figure 5:
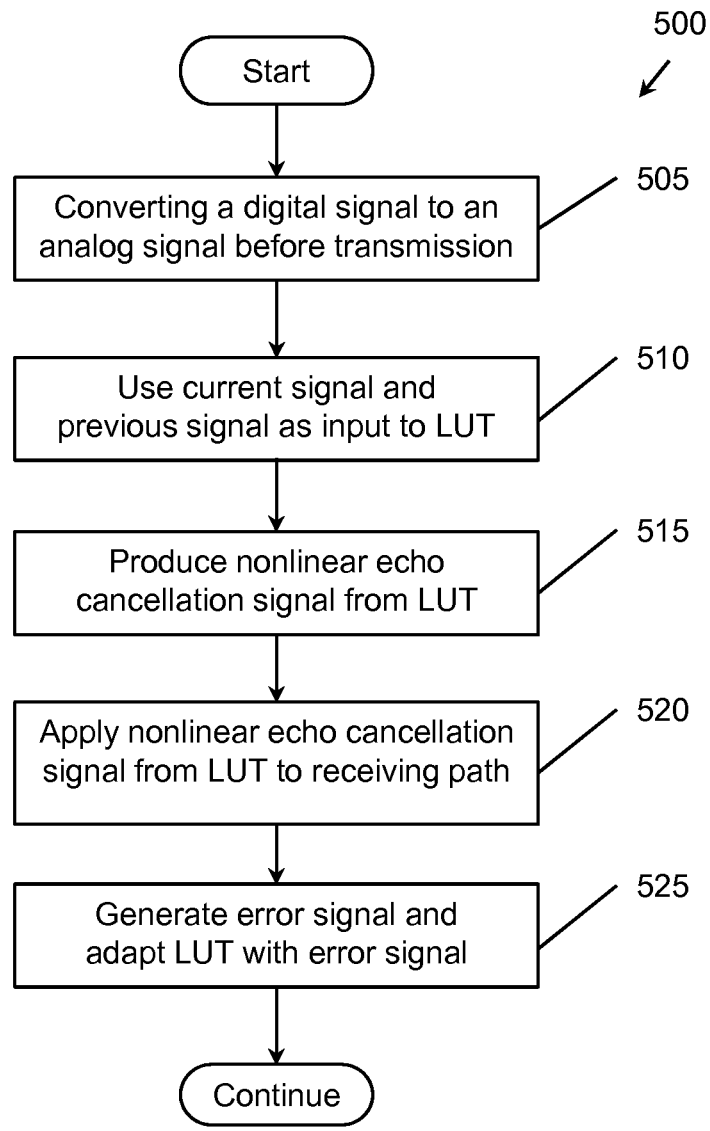
FIG. 5 illustrates one embodiment of a method associated with nonlinear echo cancellation.

With reference to FIG. 5, an example operation of the apparatus 100 (FIG. 1) is shown as a flow chart 500, in one embodiment. It will be appreciated that although the flow chart 500 is illustrated in serial form, one or more actions may be performed in parallel and/or in different orders. At 505, the operation begins with converting a digital signal to an analog signal before transmission. At 510, the current signal and the previous signal from the transmission path are input to a look-up table as an address to determine a nonlinear echo cancellation signal. At 515, the nonlinear echo cancellation signal is produced from the look-up table from a table entry corresponding to the input address. As previously described, cancellation signals are determined from observed echo signals associated with pairs of transmitted signals.

At 520, the nonlinear echo cancellation signal is applied to the receiving path and combined with the received signal. At 525, the combination generates an error signal (e.g. a difference value), which may then be fed back to the look-up table to adapt the corresponding table entry and cancellation value. The filter (as described above) may also be adapted. The operation can then continue and repeat for additional transmitted and received signals.

Accordingly, the disclosure describes various embodiments of an apparatus for eliminating or at least reducing nonlinear distortion in the echo signal that is fed back to a receiver. One embodiment is implemented based on the 10G Base-T standard. The DAC 120 is modeled to contain an arbitrary nonlinearity spanning 2 symbol intervals. The present cancellation technique does away with making an assumption on the degree of the nonlinearity. In another embodiment, the present apparatus includes an innovative method to estimate the echo channel through which the DAC nonlinearity propagates before being output by the ADC 110. In another embodiment, DC leakage, linear leakage and norm leakage terms are designed to prevent LUT entries from saturating the fixed point dynamic range or converging to a trivial solution.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of these elements.

While for purposes of simplicity of explanation, illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A communication device, comprising:
   a communication path configured to receive and transmit signals;
   a look-up table configured to store a plurality of cancellation values arranged in a two-dimensional grid, wherein the plurality of cancellation values are used to cancel non-linear distortion from the communication path; and
   a cancelling circuit configured to use the look-up table to determine a cancellation value from the plurality of cancellation values to apply to the communication path to compensate for the non-linear distortion on the communication path,
   wherein the cancelling circuit is further configured to determine the cancellation value by addressing the look-up table using a first signal and a second signal.

2. The communication device of claim 1, wherein the first signal and the second signal are consecutive signals transmitted on the communication path, and wherein the value of the first signal and the value of the second signal correspond to a cell within the look-up table that stores the applicable value.

3. The communication device of claim 1, further comprising:
   an error logic configured to adjust the cancellation values in the look-up table using an error signal, wherein the error signal is a remnant of the non-linear distortion that results from applying one or more of the plurality of cancellation values from a signal received on the communication path.

4. The communication device of claim 1, further comprising:
   a transmitter connected to a transmission path of the communication path; and
   a receiver connected to a receiving path of the communication path.

5. The communication device of claim 4, further comprising:
a hybrid circuit connected between the transmitter and the receiver, wherein the hybrid circuit is configured to separate transmission signals and received signals, and wherein the hybrid circuit is further configured to feedback transmission signals to the receiver.

6. A method, comprising:
generating, in a communication device, an address to a look-up table by using a first signal and a second signal, wherein the look-up table is a two-dimensional look-up table configured to store a plurality of cancellation values arranged in a two-dimensional grid; and
producing, in the communication device, a cancellation signal according to a cancellation value in the look-up table that corresponds to the address,
wherein the first signal and the second signal are consecutive signals transmitted by the communication device, and wherein the plurality of cancellation values are used to reduce distortion on a communication path.

7. The method of claim 6, wherein the distortion is non-linear echo distortion that is produced by a digital-to-analog converter in the communication device.

8. The method of claim 6, further comprising:
applying the cancellation signal to a receiving path in the communication device to compensate for distortion on the receiving path that is based, at least in part, on the first signal and the second signal.

9. The method of claim 8, wherein applying the cancellation signal to the receiving path includes applying the cancellation signal to a received signal after conversion of the received signal to a digital form.

10. The method of claim 6, further comprising:
compensating, for transmission delay, prior to using the first signal and the second signal as an input to the look-up table, wherein the first signal is a signal that is currently being transmitted on a transmission path and the second signal is a signal that was transmitted immediately prior to the signal that is currently being transmitted on the transmission path.

11. The method of claim 6, further comprising:
applying a linear echo cancellation signal to a receiving path in the communication device, wherein the linear echo cancellation signal is configured to compensate for linear echo distortion in a signal that is fed back from a transmitter to a receiver in the communication device.

12. The method of claim 6, further comprising:
filtering the cancellation signal prior to applying the cancellation signal to a receiving path in the communication device.

13. A device comprising:
a transmitter;
a receiver;
an echo cancellation circuit configured to cancel non-linear echo signals by generating a cancellation signal according to a first signal and a second signal, wherein the first signal and the second signal are transmitted by the transmitter, wherein the first signal is a current signal and the second signal is a previous signal, and wherein the echo cancellation circuit is configured to apply the cancellation signal to a signal at the receiver; and
a look-up table configured to store entries addressed by the first signal and the second signal,
wherein the entries in the look-up table are a plurality of cancellation signals, wherein the look-up table is a two-dimensional look-up table, and wherein the first signal addresses a column in the look-up table and the second signal addresses a row in the look-up table.

14. The device of claim 13, further comprising:
a delay logic configured to apply a delay to a signal from the transmitter to produce the second signal that was input to the echo cancellation circuit.

15. The device of claim 13, further comprising a hybrid circuit connected between the transmitter and the receiver, wherein the hybrid circuit is configured to separate transmitted signals and received signals, and wherein the transmitter includes a digital-to-analog converter.

16. The device of claim 13, further comprising:
a filter connected between the echo cancellation circuit and the receiver, wherein the first signal and the second signal are consecutive signals transmitted by the transmitter.

* * * * *